(12) United States Patent
Sims et al.

(10) Patent No.: US 10,748,120 B2
(45) Date of Patent: Aug. 18, 2020

(54) DISPLAY BOARD WITH ELECTRONIC DISPLAY AND METHODS FOR USE THEREWITH

(71) Applicants: Terry Lynn Sims, Austin, TX (US); Robert M. Kennard, Dallas, TX (US)

(72) Inventors: Terry Lynn Sims, Austin, TX (US); Robert M. Kennard, Dallas, TX (US)

( * ) Notice: Subject to any disclaimer, the term of this patent is extended or adjusted under 35 U.S.C. 154(b) by 930 days.

(21) Appl. No.: 15/070,658

(22) Filed: Mar. 15, 2016

(65) Prior Publication Data
US 2017/0213189 A1 Jul. 27, 2017

Related U.S. Application Data

(60) Provisional application No. 62/281,419, filed on Jan. 21, 2016.

(51) Int. Cl.
*G06Q 10/10* (2012.01)
*G06Q 30/02* (2012.01)

(52) U.S. Cl.
CPC ....... *G06Q 10/109* (2013.01); *G06Q 10/1095* (2013.01)

(58) Field of Classification Search
CPC .............................. G06Q 10/10; G06Q 30/02
USPC ....................................................... 705/7.19
See application file for complete search history.

(56) References Cited

U.S. PATENT DOCUMENTS

| | | | | |
|---|---|---|---|---|
| 2001/0013016 A1* | 8/2001 | Hunter | ................... | G06Q 30/02 705/27.1 |
| 2003/0191688 A1* | 10/2003 | Prince, III | ............. | G06Q 30/02 705/14.56 |
| 2004/0212548 A1* | 10/2004 | Ruttenberg | ........... | G06F 3/1423 345/1.1 |
| 2005/0144827 A1* | 7/2005 | Decell, Jr. | ................. | G09F 3/20 40/654.01 |
| 2005/0150899 A1* | 7/2005 | Demido | ................... | A47F 7/146 221/60 |
| 2005/0197888 A1* | 9/2005 | Council | ............... | G06Q 20/203 40/654.01 |
| 2006/0100930 A1* | 5/2006 | Novak-Torre | ......... | G06Q 30/02 705/14.4 |
| 2006/0207129 A1* | 9/2006 | Parsley | ................... | G06Q 30/02 40/124.03 |
| 2006/0293904 A1* | 12/2006 | Ramanathan | .......... | G06Q 10/00 709/206 |
| 2007/0073589 A1* | 3/2007 | Vergeyle | ................ | G06Q 30/02 705/14.19 |
| 2008/0229632 A1* | 9/2008 | Dieden | ..................... | G09F 1/14 40/124.06 |
| 2010/0118200 A1* | 5/2010 | Gelman | ................. | G06F 3/041 348/578 |
| 2010/0262491 A1* | 10/2010 | Siciliano | ................ | G06Q 30/02 705/14.51 |

(Continued)

*Primary Examiner* — Nga B Nguyen
(74) *Attorney, Agent, or Firm* — Garlick & Markison; Bruce E. Stuckman

(57) ABSTRACT

A display board includes service display areas. Each service display area includes a name of a service and a delivery mechanism configured to contain contact information handouts corresponding to an entity that performs the service. The display board also includes an electronic display, which displays a contact information stream corresponding to the information provided in the contact information handouts contained in the delivery mechanisms.

17 Claims, 9 Drawing Sheets

(56) References Cited

U.S. PATENT DOCUMENTS

| | | | | |
|---|---|---|---|---|
| 2013/0041733 A1* | 2/2013 | Officer | G06Q 30/02 | |
| | | | 705/14.16 | |
| 2013/0262207 A1* | 10/2013 | Miskell | G06Q 10/10 | |
| | | | 705/14.16 | |
| 2013/0332284 A1* | 12/2013 | Faith | G06Q 30/0239 | |
| | | | 705/14.66 | |
| 2014/0149248 A1* | 5/2014 | Bao | G06Q 50/01 | |
| | | | 705/26.7 | |
| 2014/0172557 A1* | 6/2014 | Eden | G06F 3/0488 | |
| | | | 705/14.49 | |
| 2014/0337137 A1* | 11/2014 | Robertson | G06Q 30/0264 | |
| | | | 705/14.61 | |
| 2014/0365395 A1* | 12/2014 | Arguelles | G06Q 10/10 | |
| | | | 705/342 | |
| 2015/0254578 A1* | 9/2015 | Chi | G06Q 10/00 | |
| | | | 705/342 | |
| 2015/0278248 A1* | 10/2015 | Chen | G06F 16/5838 | |
| | | | 382/118 | |
| 2015/0294361 A1* | 10/2015 | Yedidim | G06Q 30/0261 | |
| | | | 705/14.58 | |
| 2016/0072916 A1* | 3/2016 | Milbury, Jr. | H04L 67/306 | |
| | | | 709/217 | |
| 2016/0125466 A1* | 5/2016 | Kulkarni | G06F 3/04883 | |
| | | | 705/14.58 | |
| 2016/0292744 A1* | 10/2016 | Strimaitis | G06Q 30/0269 | |

* cited by examiner

DISPLAY BOARD WITH ELECTRONIC DISPLAY AND METHODS FOR USE THEREWITH

CROSS REFERENCE TO RELATED APPLICATIONS

The present U.S. Utility Patent Application claims priority pursuant to 35 U.S.C. § 119(e) to U.S. Provisional Application No. 62/281,419, entitled "DISPLAY BOARD WITH ELECTRONIC DISPLAY AND METHODS FOR USE THEREWITH", filed Jan. 21, 2016, which is hereby incorporated herein by reference in its entirety and made part of the present U.S. Utility Patent Application for all purposes.

TECHNICAL FIELD OF THE INVENTION

The present invention relates to display boards, electronic displays and transmission of information via communication networks.

DETAILED DESCRIPTION OF THE INVENTION INCLUDING THE PRESENTLY PREFERRED EMBODIMENTS

Figure 1:
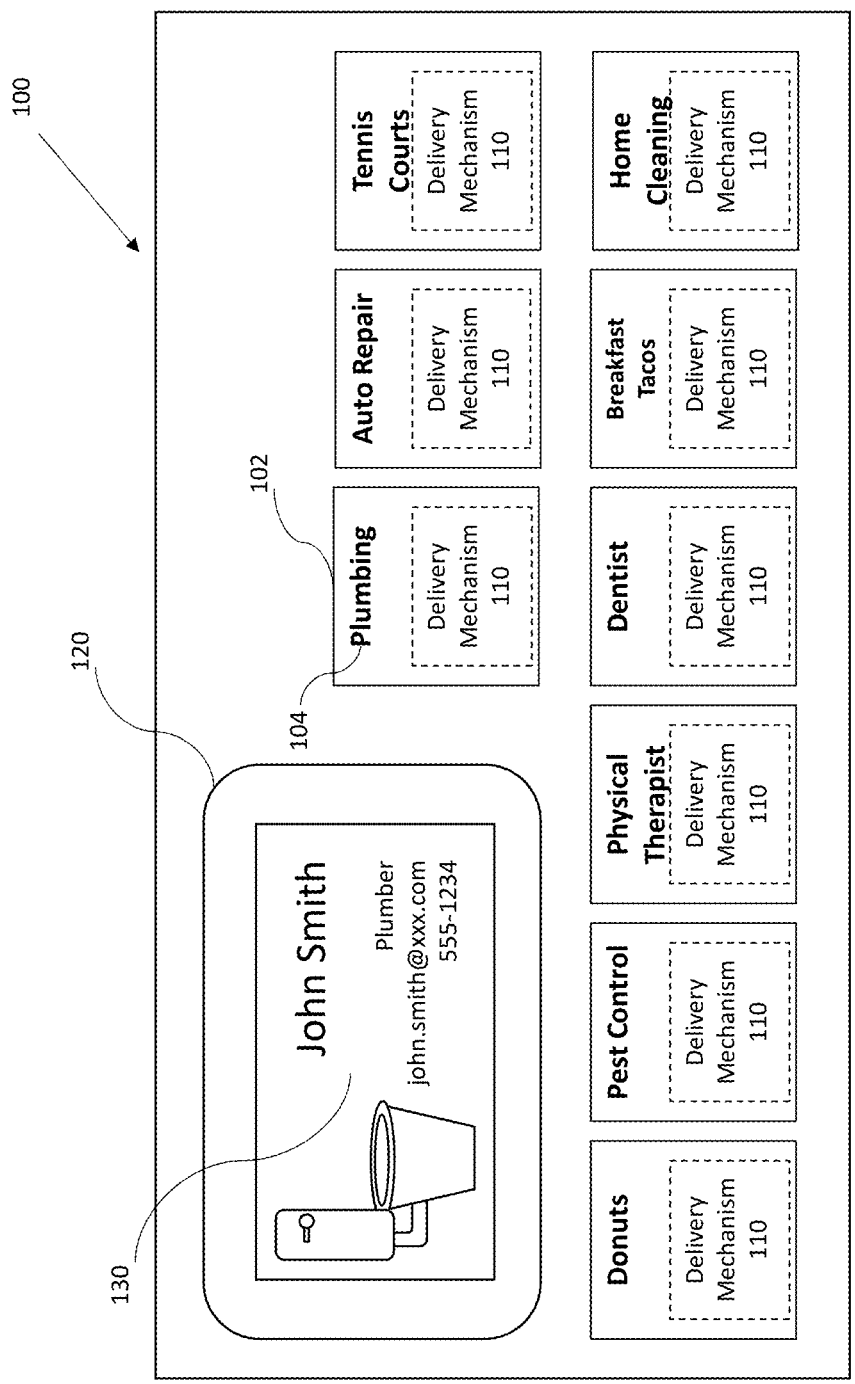
FIG. 1 presents a pictorial representation of a display board 100 in accordance with an embodiment of the present invention.

FIG. 1 presents a pictorial representation of a display board 100 in accordance with an embodiment of the present invention. One or more service displays areas 102 are depicted on the display board 100. Each service display area 102 includes a name of a service 104 and a delivery mechanism 110. The delivery mechanism is configured to contain contact information handouts corresponding to an entity that performs the service. The display board 100 also includes an electronic display 120, which displays a contact information stream 130 corresponding to the information provided in the contact information handouts contained in the delivery mechanisms 110.

The display board 100 can be made of cardboard, paper, laminated paper, laminated chipboard, melamine, wood, corkboard, or any other material that is capable of displaying content and supporting the electronic display 120. The display board 100 can be free standing, or can be applied directly on to one or more walls of an enterprise such as a store, restaurant, service establishment, entertainment venue or other business. The electronic display 120 can include a television, monitor, computer, tablet, photo display device or other video/image display device that displays an optical image stream, such as a succession of optical images either directly or indirectly, such as by optical transmission or projection. The electronic display 120 can be attached directly to the front of the display board 100, or can be mounted on the reverse side of the display board 100, where the screen is still visible on the front side of the display board.

The delivery mechanism 110 is configured to hold or otherwise contain information handouts corresponding to at least one service performed by an entity. By way of example, the service can be the sale of a product, the practice of an occupational professional, the performance of or task, or any other exchange of goods or services that can be performed by an entity. Accordingly, the name of the service 104 on the service display 102 can be the name of a good or product for sale, for example, "Breakfast Tacos"; the name of an occupation, for example, "Dentist"; the name of the task or service to be performed, for example, "Home Cleaning"; a place where goods are services are exchanged, for example "Tennis Courts"; or any other indication of an exchange of goods or services that can be performed by an entity. An entity can be a person, a business, an organization, or any other individual or group capable of performing the exchange of goods or services indicated.

The content of the contact information handouts contained in the delivery mechanisms 110 can include the name, location, phone number, email address, website Uniform Resource Locator (URL), logo, specialization, mailing address, business hours, and/or any other information related to the identity of the entity and/or any other means of contacting the entity. Similarly, the contact information stream 130 can include images corresponding to the service display areas of a display board 100. In particular, the images can each contain the information presented in one of the contact information handouts, presented in repeated succession or as another stream of images or information.

An advertiser who wishes to display his business card my press a "sign up" button on the electronic display 120 and, for example, obtain a license with a selectable duration and associated price to have his/her/its business cards displayed on the board. For example, the advertise could select between silver, gold or platinum plans having differing durations, process and optionally other amenities, such as whether or not the electronic display 120 will display their information, for how long at a time (2 seconds, 4 seconds, 10 seconds . . . ), etc. Once a plan is selected, the advertiser can pay for the subscription plan by an electronic payment system such as Apple Pay, PayPal, swiping their debit/credit card on a card reader associated with the electronic display 120 or other payment methodology. The subscription can be completed by the advertiser entering text such as, "our company performs roof replacement services for Austin and the surrounding areas for both residential and commercial structures", a website address associated with the subscriber, an image such as a photo that is transmitted to the electronic display 120 via the Internet or directly via smartphone, tablet or personal computer having a Bluetooth or 802.11 wireless transceiver.

In various embodiments, the electronic display 120 displays the contact information 130 contained in each delivery mechanism in repeated succession. This is achieved as the electronic display displays contact information stream 130 as a video, slideshow of pictures or text content, or any other means of displaying the contact information electronically in repeated succession. For example, the electronic display 120 can display images of the business cards or other contact information handouts corresponding to each service display in repeated succession. In accordance with the example shown, the contact information stream 130 can present a succession of images of business cards or otherwise containing similar information and/or other information or imagery for, plumbing, auto repair, tennis courts, donuts, pest control, a physical therapist, a dentist, breakfast tacos and home cleaning. An image corresponding to each business card can be displayed by the electronic display 120 for a period of time, such as 4 seconds, 15 seconds or some other time duration. When all images have been displayed, the contact information stream 130 can repeat the image succession again.

In various embodiments, display board 100 is an advertising media that allows individuals to market their business directly to the public by making their business cards available to anyone looking for their products or services. In various embodiments, a person viewing the display board 100 can search for a service of interest by viewing the names of services 104 on various service displays 102, and retrieve a contact information handout contained in its delivery mechanism 110 in the corresponding service display for the service of interest. In addition, a person viewing the display board 100 can watch the electronic display to view contact information stream 130. That person can then determine an entity of interest based on the contact information stream 130 and can retrieve a corresponding contact information handout contained in its delivery mechanism 110.

In various embodiments, the electronic display 120 is interactive and can perform other functions besides merely the display of the content information stream 130. In particular, the electronic display 120 can enable the user to interrupt the display of the content information stream 130 by pressing a button, touching the screen or other user interaction, in order to enter a mode of the electronic display 120 where the user can perform one or more supplemental functions. For example, the electronic display 120 can allow the user to select one of a number of options for finding contact information, such as a search by category, or keyword search for service name or entity name. Such searches can be limited to contact information on the display board at the user's location, or to search contact information stored across all display boards located within a specified radius. The search can return contact information for display to the user. The search can return a spatial depiction of the display board itself, with the location of the service display corresponding to the entity returned in the search result highlighted or otherwise indicated to the user so that they can more easily find the delivery mechanism to retrieve the contact information handout for the entity.

In various embodiments, the electronic display 120 can enable the user to interact directly with web content associated with a particular entity. For example, the interactive electronic display can enable the user to view a map of the location of the entity, view a webpage associated with the entity, view third-party reviews associated with the entity, and/or view posts or photos relating to the entity on social media sites such as Facebook, Twitter, or Instagram. The electronic display 120 can allow the user to post their own review of an entity they have already received goods or services from. The interactive electronic display can allow the user to post comments to the webpage or social media profile associated with the entity and/or to "like" the entity. The interactive electronic display can allow the user to share a website, content, or social media profile associated with an entity on the user's own social media profile.

In various embodiments, the interactive electronic display can enable a user to retrieve the contact information of an entity electronically. The interactive electronic display can prompt the user to enter an email or phone number to enable the contact information to be emailed to a user's personal email address or mobile phone. The emailed or texted contact information can be an electronic business card file such as a vCard, an image of a business card, or text including the entity name, location, phone number, email address, website Uniform Resource Locator (URL), logo, specialization, mailing address, business hours, and/or any other information related to the identity of the entity and/or any other means of contacting the entity. In particular, the location of the entity can be sent as an address, coordinate data, or a website URL linking to a map of the location.

In various embodiments, the interactive electronic display can also enable the user to subscribe to future communications, updates, events, and/or deals associated with an entity. For example, a user can be prompted by the interactive display to enter their email address and/or phone number to subscribe to these future communications, updates, events, and/or deals.

In various embodiments, the interactive electronic display can include an appointment application that allows a user to make an appointment for a particular service. For example, a user, after viewing the contact information for a particular hairdresser, can decide to book a hair appointment at the display board. The appointment can also be made for a delivery of a good on a particular date, at a particular time, to a particular location. For example, the user can use the appointment application to place an order for breakfast tacos to the office tomorrow morning. The interactive electronic display can display calendar information, indicating dates and times that the entity is available. As a user books an appointment through this application, they can be prompted to include their contact information and/or payment information, and can be sent an email or text confirmation once the appointment has been booked. The user can be prompted to include additional information when booking the appointment, such as the home address if the appointment involves a house call, or other details that can be required before the appointment. The user can, for example, receive a discount or special offer if they book their appointment directly at the display board to further encourage them to book the appointment while at the display board, since some users could be prone to forgetting about their desire for the service later.

In various embodiments, the interactive electronic display can enable a user to share and/or recommend the services of an entity to another person. For example, a user can recommend a pest control entity to a friend who has recently had pest control problems. The user can be prompted to enter the email or phone number of another person. A greeting message indicating the recommendation of the entity by the user and/or contact information of the entity can be sent electronically to this person. The interactive electronic display can give the user the option to share a website, content, or social media profile to another person's social media page.

The user can be incentivized by a discount or special offer to share and/or recommend the services of the entity to others.

In various embodiments, each delivery mechanism 110 contains contact information handouts for no more than one designated entity that performs the service. For example, an entity can become a subscriber of a display board 100. Each subscriber will be granted exclusive use for their particular business and/or service associated with that particular board. Subscriptions can be ordered, for example, for 3 months, 6 months or annually, and subscription fees are paid up front for the term of the subscription. Furthermore, the delivery mechanism of a service display can indicate that space is available when there is no designated entity that performs the service or otherwise when no business cards are contained in the card holder. For example, a label can be placed behind or on the inside of the service display 102 to inform the viewer that a particular subscription is available. The label can say "space available" or some other instruction to the viewer.

In various embodiments, a display board 100 is located at a particular enterprise, for example, a store or other establishment. This enterprise can be paid, for example, a percentage of the fees collected from subscribers of that particular board.

In various embodiments, display boards can be franchised by a primary business to third parties, or franchisees". For example, display boards can be built at a franchisee's request and shipped to the franchisee. The franchisee will then have the option to arrange for their own enterprise locations, or "stores", where the board or boards can be mounted. The franchisee will receive a portion of the income, with the remaining portion being distributed, for example, between the primary business and the store or other establishment where the display board is installed.

Further details regarding the present invention including additional embodiments, optional implementations, and further functions and features are presented in conjunction with FIGS. 2-8 that follow.

Figure 2:
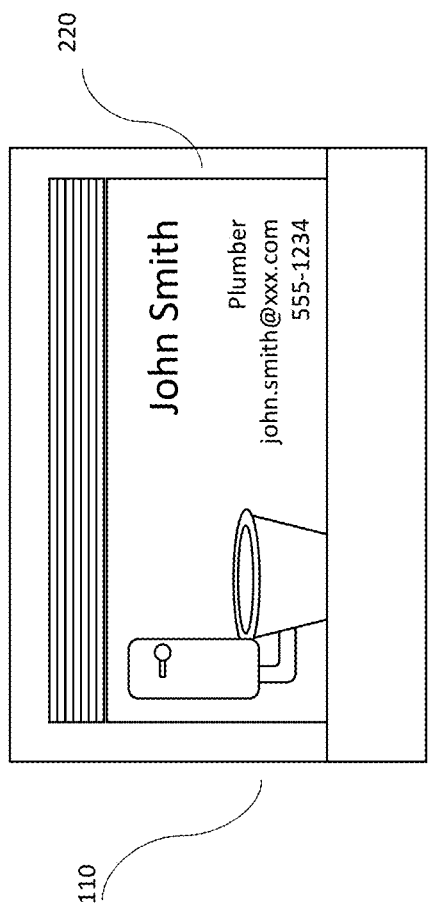
FIG. 2 presents a pictorial representation of a front view of delivery mechanism 110 in accordance with an embodiment of the present invention.
Figure 3:
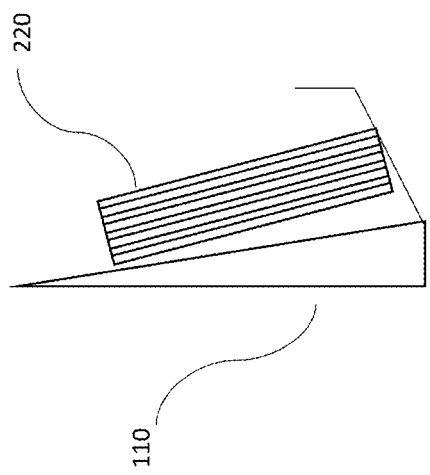
FIG. 3 presents a pictorial representation of a side view of a delivery mechanism 110 in accordance with an embodiment of the present invention.

FIG. 2 presents a pictorial representation of a front view of delivery mechanism 110 in accordance with an embodiment of the present invention, and FIG. 3 presents a pictorial representation of a side view of a delivery mechanism 110 in accordance with an embodiment of the present invention. Delivery mechanism 110 contains at least one contact information handout 220. In the example shown, the delivery mechanism 110 is a business card holder, and the contact information handout 220 is a business card, however other configurations are likewise possible. Delivery mechanism 110 can also include a drawer, hook, folder, slot, pouch, or any other mechanism for holding and dispensing contact information. Delivery mechanism 110 can be bound to a service display within a display board 100 by permanent adhesive, screws, nuts, nails, staples, pins, or any other material capable of attaching the delivery mechanism to the display board. Contact information handout 220 can also include leaflets, paper flyers, tags or any other handout that displays contact information for an entity.

Figure 4:
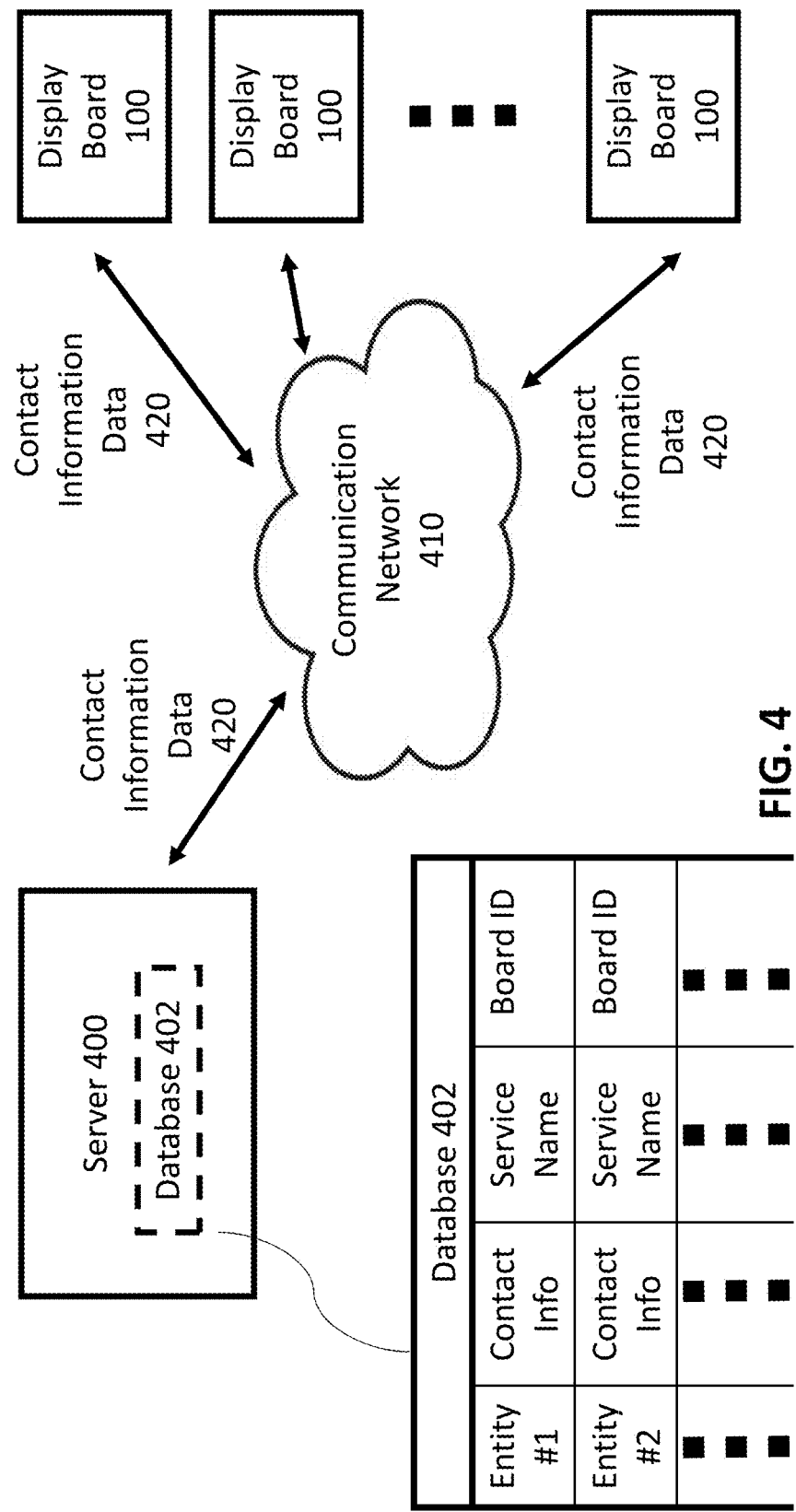
FIG. 4 presents a block diagram representation of server 400 and communication network 410 in accordance with an embodiment of the present invention.

FIG. 4 presents a block diagram representation of server 400 and communication network 410 in accordance with an embodiment of the present invention. The server 400 includes a database 402. Contact information data 420 is exchanged between the server 400 and one or more display boards 100.

Communication network 410 can include a public or private network such as a wireless or wired data network, local area network, wide area network, metropolitan area network or the Internet. The server 400 can include a multimedia server, personal computer, wireless local area network (WLAN) access point, broadband modem, 3G or 4G transceiver or other media gateway or transceiver that is capable of transmitting and receiving contact information data 420 via communication network 410. The database 402 can be a relational database, an XML file, or any other structure of storing, organizing, and updating contact information electronically.

In various embodiments, the database 402 can contain one or more entries. Each entry can include an entity name or ID, the name or ID for the service display corresponding to the entity, the name or ID of one or more display boards where the entity is displayed, the contact information for the entity, and/or subscription information, for example current subscriptions, subscription deadlines, and/or payment history. The contact information for the entity can include the name, location, phone number, email address, website Uniform Resource Locator (URL), logo, specialization, mailing address, business hours, and/or any other information related to the identity of the entity and/or any other means of contacting the entity. This contact information can be stored, for example, relationally by category, as delimited text, as an electronic business card file such as a vCard file, or as an image of a business card.

The contact information data 420 can be in the form of one or more files containing the details of the contact information stored in the database 402 for a subset of entities, including text files, comma-separated values (CSV) files, extensible markup language (XML) files, Personal Data Form (PDF) files, Hypertext Markup Language (HTML) files, image files such as Portable Network Graphics (PNG) files or Joint Photographic Experts Group (JPEG) files, electronic business card files such as vCard files, or any file other type that allows the contact information contained in the file to be viewed and/or parsed.

The contact information data 420 can instead be in the form of one or more video signals, multimedia signals or other media signals that are data files that contain media content in a digital format. For example, such a file can contain a subset of the contact information stored in the database 402 as a video file, where the contact information for each entity is displayed in succession, to be repeated on a loop by the electronic display 120.

In various embodiments, the database 402 contains an aggregation of contact information 220 for all advertisement boards 100, and information indicating on which display boards the contact information for a particular entity is to be displayed. The server 400 can send the contact information data 420 for a subset of entities stored in the database 402 to a display board 100. This subset of entities can reflect, the contact information corresponding to the contact information handout 220 contained in each of the delivery mechanism 110 corresponding to each service display 102 of that display board. This desired contact information for a subset of entities stored in database 402 can be converted to contact information data 420 in a format as discussed previously, and this contact information data 420 can be transmitted to one or more desired display boards via communication network 410. The contact information data 420 transmitted between to one display board can be the same or different than the contact information data 420 transmitted to a second display board. For example, a server can send one contact information for one subset of entities to the display board in one location and contact information for a second subset of entities to a second location, as the different locations can have different service displays to appeal to different demographics of people expected in each location, or the geographic distance between the two locations necessitates providing contact information for two separate entities that perform the same service.

In various embodiments, the contact information data 420 can be updated to reflect changes in the contact information. Database 402 can be updated directly, or via communication network 410, to reflect desired changes. Server 400 can transmit updated contact information data to the necessary display boards via the communication network in response to changes in the database, or on a fixed schedule. Changes in the contact information data 420 can occur when the contact information handouts 220 contained in a particular delivery mechanism change. This can be due to a change in the designated entity for a particular service display on one or more display boards, for example, due to a subscriber change as discussed in previous embodiments.

Figure 5:
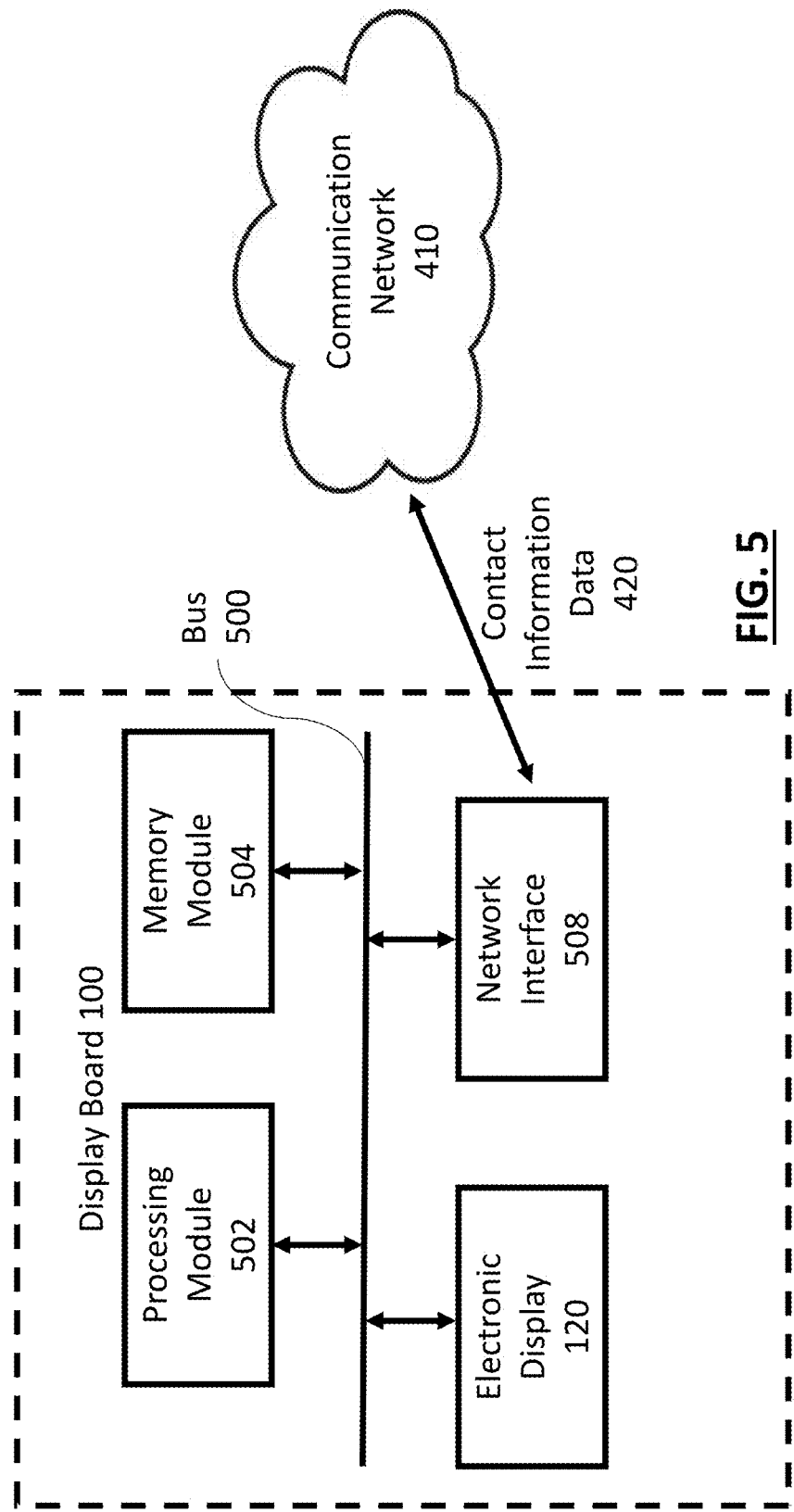
FIG. 5 presents a block diagram representation of a display board 100 in accordance with an embodiment of the present invention.

FIG. 5 presents a block diagram representation of a display board 100 in accordance with an embodiment of the present invention. The display board 100 includes a processing module 502, memory module 504, the electronic display 120 described in FIG. 1, and network interface 508, that are interconnected via bus 500. Contact information data 420 can be transferred between the network interface 508 and the communications network 410, described in FIG. 4.

Processing module 502 controls the operation of the electronic display 120 and/or provides processing required by other modules of the display board 100. Processing module 502 can each be implemented using a single processing device or a plurality of processing devices. Such a processing device can be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory module 504. Memory module 504 can be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions can be embedded within, or external to, the circuitry comprising the state machine, analog circuitry, digital circuitry, and/or logic circuitry. While a particular bus structure is shown, other architectures, including the use of additional busses and/or direct connectivity between elements are likewise possible.

Network interface 508 can operate via a wired link for receiving contact information data 420 from communication network 410. The network interface 508 can include an Ethernet connection, Universal Serial Bus (USB) connection, an Institute of Electrical and Electronics Engineers (IEEE) 1394 (Firewire) connection, small computer serial interface (SCSI) connection, a composite video, component video, S-video, analog audio, video graphics array (VGA), digital visual interface (DVI) and/or high definition multimedia interface (HDMI) connection or other wired connection that operates in accordance with either a standard or custom interface protocol. Network interface 508 can also operate via a wireless link that operates in accordance with a wireless network protocol such as 802.11a,b,g,n (referred to generically as 802.11x), Ultra Wideband (UWB), 3G or 4G or other wireless connection that operates in accordance with either a standard or custom interface protocol in order to receive contact information data 420.

While the network interface has been described above in conjunction with receiving contact information data 420, the network interface 508 optionally provides Internet connectivity or other network support to facilitate additional user interaction modes of the electronic display 120. For example, user interaction via the electronic display can facilitate a search for contact information in response to the user selection of one of: a service category, a service name, or an entity name. User interaction via the electronic display can also facilitate user interaction with web content associated with a selected one of the plurality of entities; transmission of an electronic message indicating the contact information corresponding to a selected one of the plurality of entities to a personal email address or a mobile phone text address; subscription to communications from a selected one of the plurality of entities via one of: email messaging or text messaging; transmission of a recommendation of a selected one of the plurality of entities to one or more other people, and or one or more additional functions.

On operation, processing module 502 coordinates the operation of electronic display 120 to display the contact information stream 130 described in FIG. 1. The processing module 502 populates the contact information stream 130 based upon the content of the contact information data 420 received from the communication network 410. This can be accomplished, for example, by parsing text within the contact information data, extracting images from the contact information data, formatting data contained in the contact information data for display, and/or directly playing a video file extracted from the contact information data. As previously discussed, in various embodiments, the user can interact with the electronic display 120 to pause or otherwise interrupt the content information stream 130 in order to perform one or more of the additional user interaction modes described above.

Figure 6:
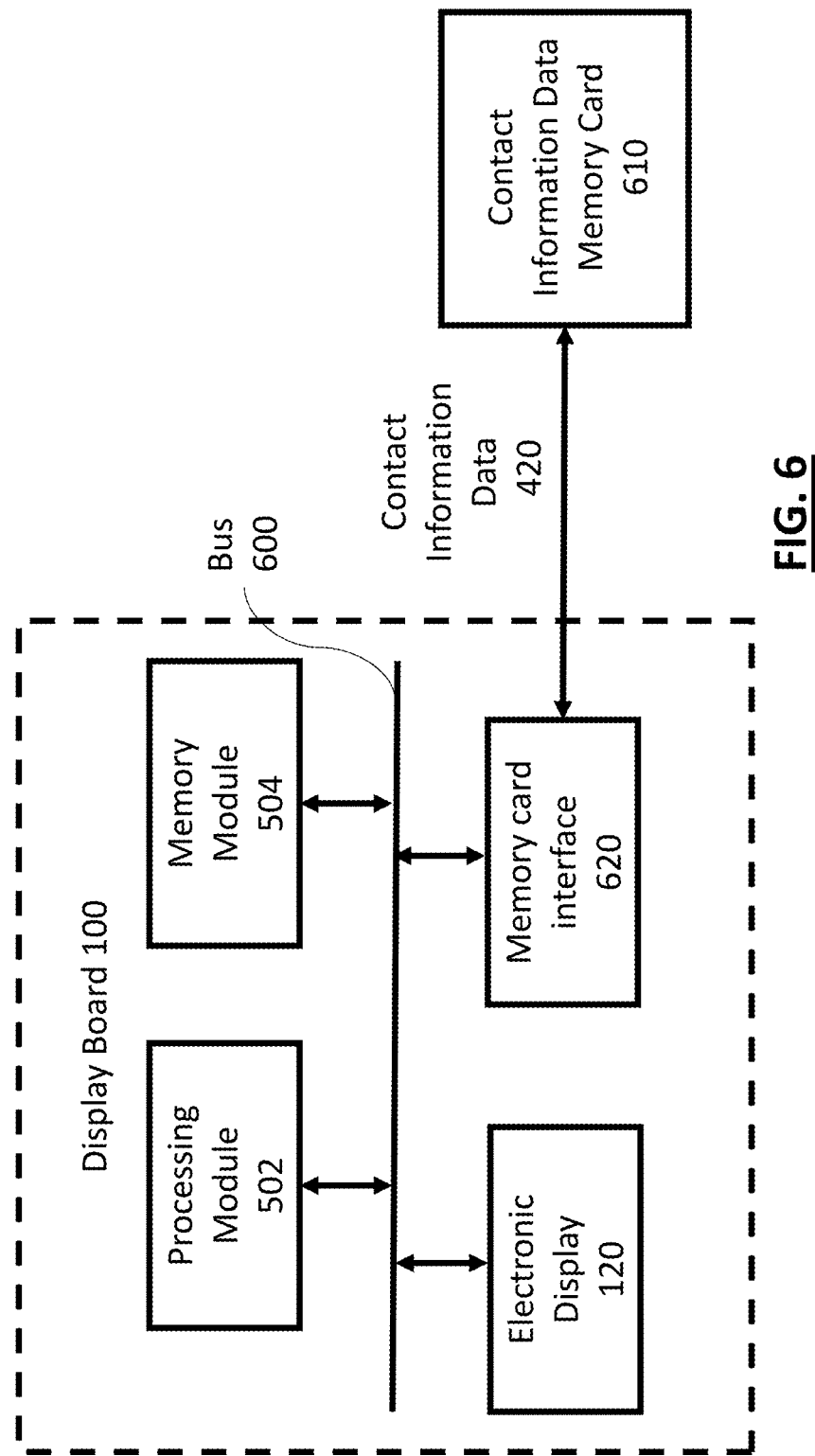
FIG. 6 presents a block diagram representation of a display board 100 and memory card 610 in accordance with an embodiment of the present invention.

FIG. 6 presents a block diagram representation of a display board 100 and memory card 610 in accordance with an embodiment of the present invention. As described in FIG. 5, the display board 100 includes a processing module 502, memory module 504, the electronic display 120 described in FIG. 1, and memory card interface 620, that are interconnected via bus 600. Contact information data 420, described in FIG. 4, can be transferred to bus 600 from a contact information data memory card 610, when inserted in or otherwise coupled to the memory card interface 620. The contact information data memory card 610 can be a Secure Digital (SD) card, a Compact Flash card, xD card, Memory Stick, Personal Computer Memory Interface Associate (PCMCIA) memory card and/or any other memory card device that stores digital information. In various embodiments, contact information memory card 610 stores contact information data 420, which contains the contact information 220 contained in delivery mechanism 110 for each service display 102 of the display board 100, as described in FIG. 4. Connecting the memory card to bus 600 enables processing module 502 to coordinate the operation of electronic display 120 to display the contact information stream 130 described in FIG. 1. The processing module 502 populates the contact information stream 130 based upon the content of the contact information data 420 received from the contact information memory card 610. This can be accomplished, for example, by parsing text within the contact information data, extracting images from the contact information data, formatting data contained in the contact information data for display, and/or directly playing a video file extracted from the contact information data 420.

In various embodiments, the contact information data memory card 610 can be altered or substituted with a different contact information data memory card to reflect changes in the contact information. Changes in the contact information data 420 can occur when the contact information handouts contained in a particular delivery mechanism change. This can be due to a change in the designated entity for a particular service display on one or more display boards, for example, due to a subscriber change as discussed in previous embodiments.

Figure 7:
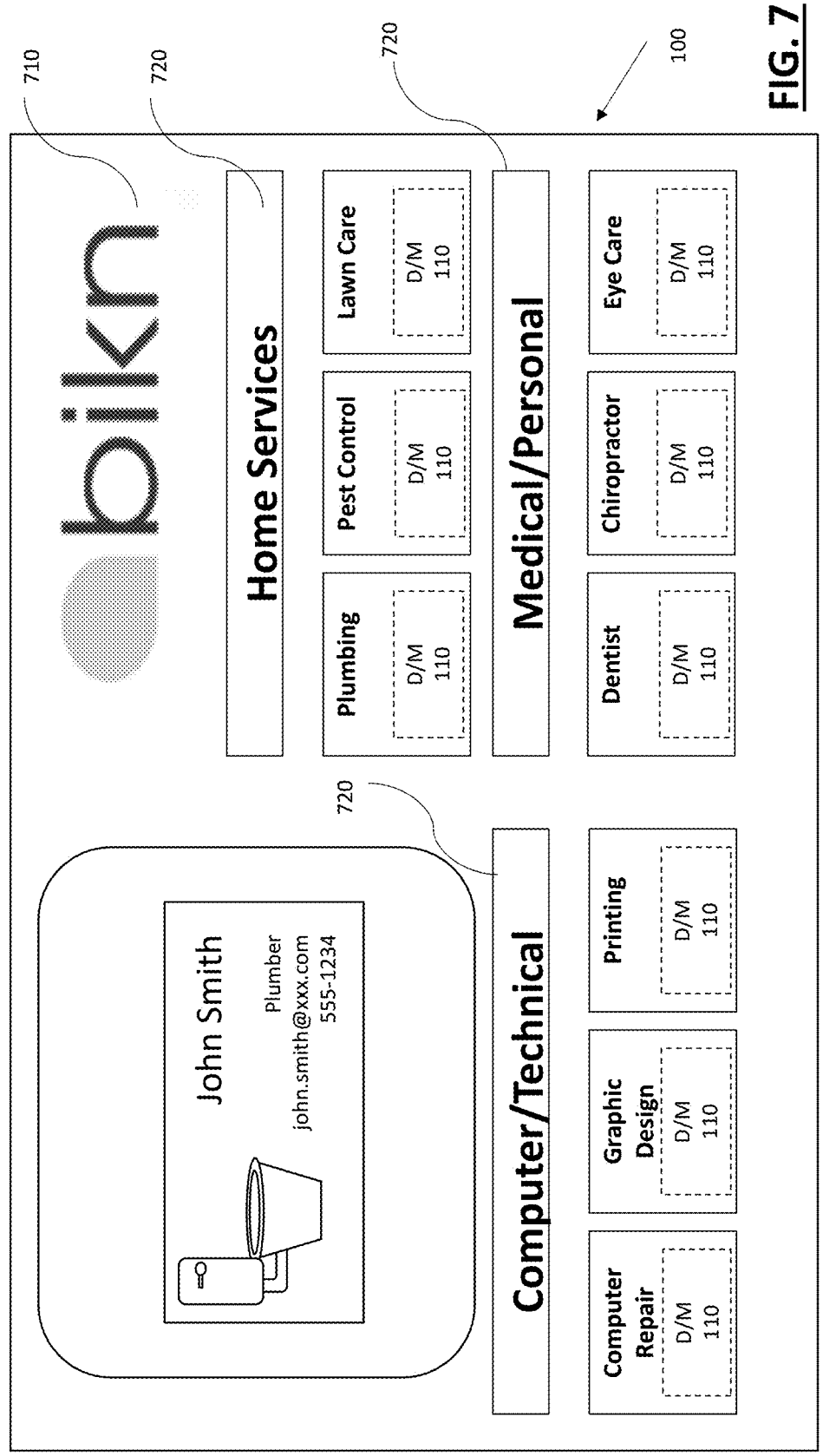
FIG. 7 presents a pictorial representation of a display board 100 in accordance with an embodiment of the present invention.

FIG. 7 presents a pictorial representation of display board 100 in accordance with an embodiment of the present invention. In addition to the contents of display board 100 described in FIG. 1, display board 100 contains a name and/or an image 710 corresponding to the enterprise where the display board is located. Display board 100 also contains at least one category name 720, and the service displays 102 as described in FIG. 1 are spatially arranged according to their corresponding category.

Figure 8:
FIG. 8 presents a pictorial representation of a display board 100 in accordance with an embodiment of the present invention.

FIG. 8 presents a pictorial representation of an electronic display 120 in accordance with an embodiment of the present invention. In the example shown, the display board 100 is designed using a dry erase marker board, or other type of board, that measures 3 ft wide by 4 ft in length. However, the shape of the board can be different than these dimensions and/or can be rotated to be wider than longer. The business logo of the location where the board is placed, the "local business logo", can be located on the top of the board or at such location deemed appropriate. The display board 100 can be arranged the board with 8 multi-colored business categories 720 evenly spaced and 40 individual business titles or service names 102 related to each business category. Under each of the service names, a business card holder is attached to the board. The business card holder can be acrylic, plastic, glass, wire mesh, or other material and attached with a permanent adhesive, bound to the board with screws, bolts or other fasteners, and/or one or more magnets that can be applied to the side of a vehicle or steel structure such as a food truck, food trailer, kiosk, as applicable. The business card holder can be colored to match the color of the parent business category 720, for example.

In various embodiments, the electronic display is an electronic tablet. The electronic tablet can be, for example, 7" wide by 5" in length. The tablet is mounted on the reverse side of the board directly below the local business logo. The display of the electronic tablet is set facing the customer and an opening the size of the tablet screen will allow customers to view the tablet. The tablet displays a streaming video of each business card on the board for approximately 4 seconds and will automatically loop back to the beginning and start over. The tablet is connected to the Internet and can be updated remotely. This permits removal customers who are no longer subscribers and to replace them with new customers. On the bottom of the tablet, there is a larger border with a logo and contact information for the primary business providing the service that provides and/or maintains the display board.

Figure 9:
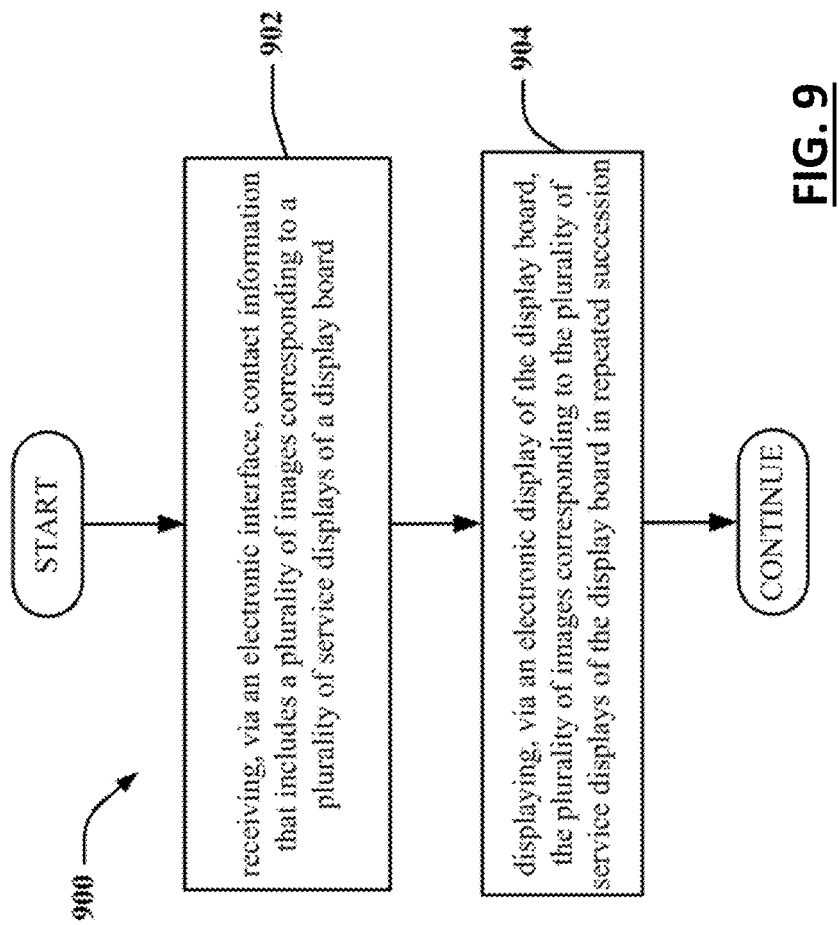
FIG. 9 presents a flow diagram representation of a method in accordance with an embodiment of the present invention.

FIG. 9 presents a flow diagram representation 900 of a method in accordance with an embodiment of the present invention. In particular a method is presented for use in conjunction with one or more functions and features described in conjunction with FIGS. 1-8. Step 902 includes receiving, via an electronic interface, contact information that includes a plurality of images corresponding to a plurality of service displays of a display board. Step 904 includes displaying, via an electronic display of the display board, the plurality of images corresponding to the plurality of service displays of the display board in repeated succession.

In accordance with various embodiments, the method further includes receiving a user interaction via the electronic display to facilitate a search for contact information in response to the user selection of one of: a service category, a service name, or an entity name; receiving a user interaction via the electronic display to facilitate user interaction with web content associated with a selected one of the plurality of entities; receiving a user interaction via the electronic display to facilitate transmission of an electronic message indicating the contact information corresponding to a selected one of the plurality of entities to a personal email address or a mobile phone text address; receiving a user interaction via the electronic display to facilitate user subscription to communications from a selected one of the plurality of entities via one of: email messaging or text messaging; and or receiving a user interaction via the electronic display to facilitate user transmission of a recommendation of a selected one of the plurality of entities to one or more other people.

It is noted that terminologies as can be used herein such as bit stream, stream, signal sequence, etc. (or their equivalents) have been used interchangeably to describe digital information whose content corresponds to any of a number of desired types (e.g., data, video, speech, audio, etc. any of which can generally be referred to as 'data').

As can be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As can also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but can adjust its current level, voltage level, and/or power level. As can further be used herein, inferred coupling (i.e., where one element is coupled to another element by inference) includes direct and indirect coupling between two items in the same manner as "coupled to". As can even further be used herein, the term "configured to", "operable to", "coupled to", or "operably coupled to" indicates that an item includes one or more of power connections, input(s), output(s), etc., to perform, when activated, one or more its corresponding functions and can further include inferred coupling to one or more other items. As can still further be used herein, the term "associated with", includes direct and/or indirect coupling of separate items and/or one item being embedded within another item.

As can be used herein, the term "compares favorably", indicates that a comparison between two or more items, signals, etc., provides a desired relationship. For example, when the desired relationship is that signal 1 has a greater magnitude than signal 2, a favorable comparison can be achieved when the magnitude of signal 1 is greater than that of signal 2 or when the magnitude of signal 2 is less than that of signal 1. As can be used herein, the term "compares unfavorably", indicates that a comparison between two or more items, signals, etc., fails to provide the desired relationship.

As can also be used herein, the terms "processing module", "processing circuit", "processor", and/or "processing unit" can be a single processing device or a plurality of processing devices. Such a processing device can be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit can be, or further include, memory and/or an integrated memory element, which can be a single memory device, a plurality of memory devices, and/or embedded circuitry of another processing module, module, processing circuit, and/or processing unit. Such a memory device can be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices can be centrally located (e.g., directly coupled together via a wired and/or wireless bus structure) or can be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions can be embedded within, or external to, the circuitry comprising the state machine, analog circuitry, digital circuitry, and/or logic circuitry. Still further note that, the memory element can store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks can also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram can include a "start" and/or "continue" indication. The "start" and "continue" indications reflect that the steps presented can optionally be incorporated in or otherwise used in conjunction with other routines. In this context, "start" indicates the beginning of the first step presented and can be preceded by other activities not specifically shown. Further, the "continue" indication reflects that the steps presented can be performed multiple times and/or can be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process can include one or more of the aspects, features, concepts, examples, etc. described with reference to one or more of the embodiments discussed herein. Further, from figure to figure, the embodiments can incorporate the same or similarly named functions, steps, modules, etc. that can use the same or different reference numbers and, as such, the functions, steps, modules, etc. can be the same or similar functions, steps, modules, etc. or different ones.

Unless specifically stated to the contra, signals to, from, and/or between elements in a figure of any of the figures presented herein can be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that can include or operate in association with a memory that stores operational instructions. A module can operate independently and/or in conjunction with software and/or firmware. As also used herein, a module can contain one or more sub-modules, each of which can be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:
1. A display board comprising:
  a plurality of service displays, each of the plurality of service displays comprising:
    a service display area that indicates a name of one of a plurality of services; and
    a plurality of delivery mechanisms, each of the plurality of delivery mechanisms configured to contain paper-based contact information handouts corresponding to one of a plurality of entities that performs the one of the plurality of services, wherein the one of a plurality of entities is at least one of: a person or business, wherein the each of the plurality of delivery mechanisms includes a business card holder, and wherein the business card holder is configured to contain physical business cards to be taken from the business card holder by a user; and an electronic display that displays, in repeated succession, contact information corresponding to information presented in the paper-based contact information handouts corresponding to the plurality of entities, wherein the contact information includes an image corresponding to one of physical business cards corresponding to each of the plurality of entities;

wherein the electronic display is an interactive electronic display and wherein the interactive electronic display enables the user to interact with the electronic display to facilitate a search for contact information in response to the user indicating one of: a service category, a service name, or an entity name, and wherein, in response to the search for contact information, the interactive electronic display displays a spatial depiction of the display board itself, wherein the spatial depiction guides the user to retrieve one of the physical business cards corresponding to one of the plurality of entities returned in a search result by highlighting a location on the display board corresponding to the one of the plurality of entities returned in the search result.

2. The display board in claim 1, wherein the electronic display is connected to a wireless network, and the contact information is received via the wireless network.

3. The display board in claim 1, further comprising:
a memory card that stores the contact information.

4. The display board in claim 1, further comprising at least one of: a name display area displaying a name corresponding to an enterprise where the display board is located, or an image display area displaying an image corresponding to the enterprise where the display board is located.

5. The display board in claim 1, wherein each of the plurality of delivery mechanisms contain the paper-based contact information handouts for no more than one of a plurality of entities that performs the one of the plurality of services.

6. The display board in claim 5, wherein each of the plurality of delivery mechanisms indicates that space is available when no contact delivery handouts are contained therein.

7. The display board in claim 1, further comprising a plurality of category name display areas that indicates a plurality of service categories, and wherein the service displays are spatially arranged according to their corresponding service category of the plurality of service categories.

8. The display board in claim 1, wherein the interactive electronic display enables the user to interact with web content associated with a selected one of the plurality of entities.

9. The display board in claim 1, wherein the interactive electronic display enables the user to interact with the electronic display to facilitate transmission of an electronic message indicating the contact information corresponding to a selected one of the plurality of entities to a personal email address or a mobile phone text address.

10. The display board in claim 1, wherein the interactive electronic display enables the user to subscribe to communications from a selected one of the plurality of entities via one of: email messaging or text messaging.

11. The display board in claim 1, wherein the interactive electronic display enables the user to interact with the electronic display to facilitate, for a selected one of the plurality of entities, booking at least one of: an appointment or delivery.

12. The display board in claim 1, wherein the interactive electronic display enables the user to interact with the electronic display to facilitate transmission of a recommendation of a selected one of the plurality of entities to one or more other people.

13. A method comprising:
receiving, via an electronic interface, contact information that includes a plurality of images corresponding to a plurality of service displays of a display board;

displaying, via an electronic display of the display board, the plurality of images corresponding to the plurality of service displays of the display board in repeated succession wherein the display board includes a plurality of delivery mechanisms, wherein each of the plurality of delivery mechanisms configured to contain paper-based contact information handouts corresponding to one of a plurality of entities that performs the one of the plurality of services, wherein the one of a plurality of entities is at least one of: a person or business, wherein the each of the plurality of delivery mechanisms includes a business card holder, and wherein the business card holder is configured to contain physical business cards to be taken from the business card holder by a user, and wherein the plurality of images includes an image corresponding to one of physical business cards corresponding to each of the plurality of entities; and receiving a first user interaction via the electronic display to facilitate a search for contact information in response to a user selection of one of: a service category, a service name, or an entity name; and displaying, via the electric display, a spatial depiction of the display board itself, wherein the spatial depiction guides the user to retrieve one of the physical business cards corresponding to one of the plurality of entities returned in a search result by highlighting a location on the display board corresponding to the one of the plurality of entities returned in the search result.

14. The method of in claim 13, further comprising:
receiving a second user interaction via the electronic display to facilitate user interaction with web content associated with a selected one of a plurality of entities, wherein the plurality of entities correspond to the plurality of service displays.

15. The method of in claim 13, further comprising:
receiving a second user interaction via the electronic display to facilitate transmission of an electronic message indicating the contact information corresponding to a selected one of a plurality of entities to a personal email address or a mobile phone text address, wherein the plurality of entities correspond to the plurality of service displays.

16. The method of in claim 13, further comprising:
receiving a second user interaction via the electronic display to facilitate user subscription to communications from a selected one of a plurality of entities via one of: email messaging or text messaging, wherein the plurality of entities correspond to the plurality of service displays.

17. The method of in claim 13, further comprising:
receiving a second user interaction via the electronic display to facilitate user transmission of a recommendation of a selected one of a plurality of entities to one or more other people, wherein the plurality of entities correspond to the plurality of service displays.

\* \* \* \* \*